Patented May 17, 1949

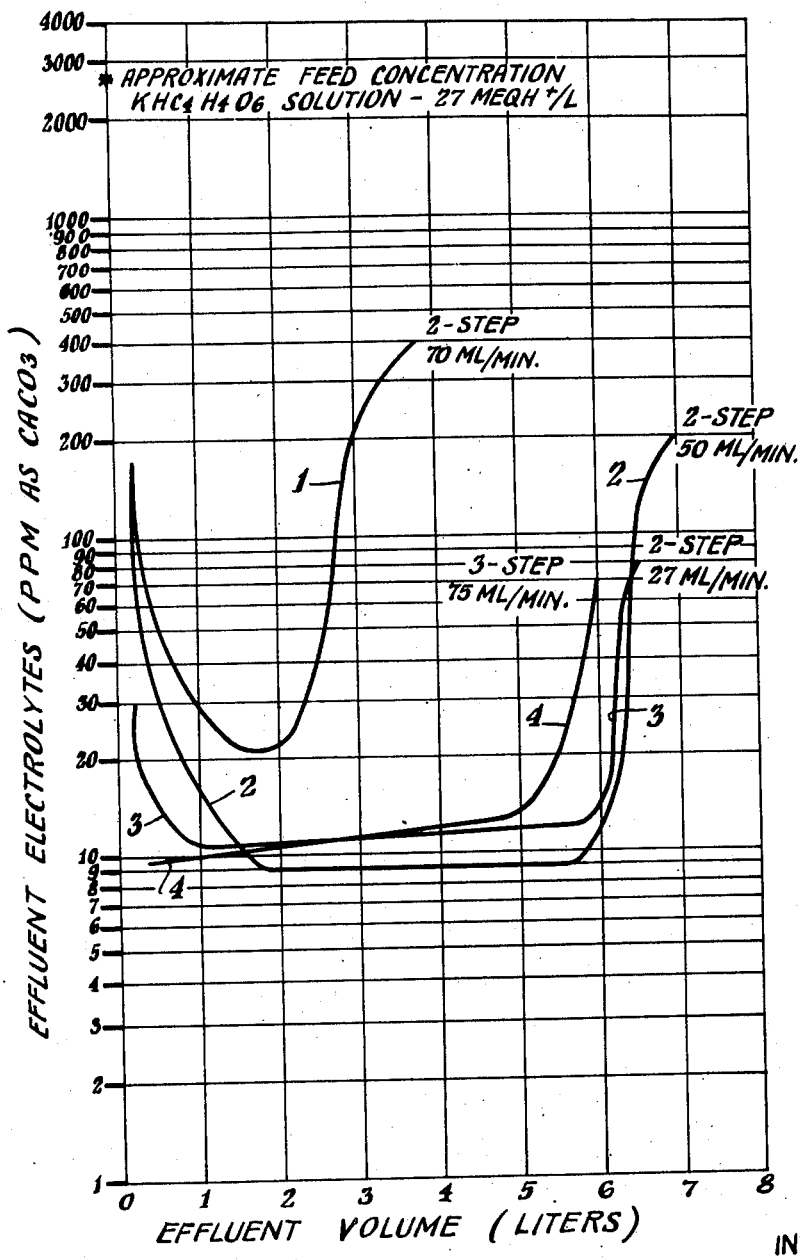

2,470,500

UNITED STATES PATENT OFFICE 2,470,500

DEMINERALIZING

Franklin I. Latimer Lawrence, Bradford, Pa., assignor to The Permutit Company, New York, N. Y., a corporation of Delaware Application August 25, 1945, Serial No. 612,704

4 Claims. (Cl. 99—1)

This invention relates to removal of electrolytes from solutions and more particularly to an improved process for the removal of electrolytes from acidic solutions of salts by means of ion exchange.

In the well known ion exchange process for the removal of salts from solutions (known as demineralizing), the electrolyte-containing solution is first brought into contact with an acid-regenerated cation exchange material. The cation exchanger adsorbs the metallic cations present in the solution and replaces them with a chemically equivalent amount of hydrogen ion. The resulting solution, of course, is acidic. The acids are then removed by contacting the acidic solution with a nalkali-regenerated anion exchange material. After exhaustion the cation and anion exchangers are regenerated by acid and alkaline solutions respectively.

With the usual substantially neutral salt solutions this process operates very well. However, when the solution to be demineralized contains appreciable amounts of acidity in addition to the salt content, demineralizing performance by the usual method suffers from greatly reduced efficiency. When treating such acid solutions to the exchange capacity of the cation exchange unit is reduced, the electrolyte content of the treated effluent is increased, or the maximum permissible flow rate must be greatly curtailed. Often two or more of the preceding effects are observed.

It is an object of this invention to provide an improved method for demineralizing solutions having a low pH or a high acid content.

Another object of this invention is to increase the capacity of cation exchange materials operating in the acid cycle or being regenerated with acids when such cation exchange material is used for the purpose of removing cations other than hydrogen from a liquid having a low pH.

A further object of this invention is to provide a method for increasing the flow rate of a salt solution having an appreciable acid content through a bed of cation exchange material without materially decreasing the efficiency of performance or the capicity of the cation exchange material.

The process of this invention consists of treating a solution containing both acids and salts first with an alkali-regenerated anion exchange material in order to remove the acids, then treating the solution with an acid-regenerated cation exchange material in order to replace all metallic cations in the solution by hydrogen ions, and finally treating the solution with another portion of alkali-regenerated anion exchange material in order to remove the acid formed by virtue of the cation exchange reaction. This process may be practised as a cyclic process by regenerating the anion exchange material and the cation exchange material with alkaline and acid solutions respectively as in the known two-step demineralizing process.

Whereas two-step demineralizing systems are normally operated at flow rates of 4.5-6 gallons per minute per square foot of bed area, I have found that the use of these flow rates with acid-containing solutions of salts results in substantial capacity reductions, greatly reduced electrolyte removal efficiency as reflected in the higher electrolyte content of the treated effluent, or both. In accordance with this invention these difficulties may be avoided by preceding the cation exchanger with an anion exchanger. Moreover, the use of my improved process, which I shall hereafter call three-step demineralizing, does not require any additional amount of ion exchanger.

It is generally known that the amount of cation exchanger necessary to treat a given solution is fixed by the metallic cation content of the solution. Likewise, the amount of anion exchange material necessary to demineralize a given solution is fixed by the anion content of that solution. In the case of the low pH solutions for which my new three-step demineralizing process is particularly adapted, the anions are present both as the anions of the salts and as acids. Regardless of the demineralizing process used, the amount of anion exchanger must be sufficient to remove both forms of anions. While in the usual two-step demineralizing process all of the anion exchange material will follow the cation exchange material in sequence, in the three-step demineralizing process of this invention the same amount of anion exchange material is used but it is divided into two portions, one of which precedes the caton exchange material and the other of which follows it.

The relative amounts of anion exchange material preceding and following the cation exchanger will depend on the relative amounts of free acid and salt in the solution to be treated if all three units are to be regenerated at approximately the same time, as is customarily desired. Thus, in the case of a solution of an acid salt, such as sodium bisulfate or potassium bitartrate, the anions present as the acid and those present as the salt are chemically equivalent and, therefore, the anion exchanger used in three-step demineralizing solutions of these salts may be equally divided into two parts; one preceding the cation exchange unit and one following the cation exchange unit. On the other hand, if a given solution contained 100 milliequivalents of acid per liter and 25 milliequivalents of salt per liter, in arranging the equipment for demineralizing such a solution by the three-step process of this invention, 80% of the anion exchange material would precede the cation exchange material and the other 20% would follow it.

I have found that this process is also applicable to solutions containing free organic acids as it is to those containing free inorganic acids. Likewise, it is equally applicable to both organic or inorganic cations or anions or mixtures of these when demineralizing solutions of low pH. The process is especially valuable for the treatment of solutions having a pH of 4 or below.

The advantages of this invention may be illustrated by a comparison of the treatment of a solution of potassium bitartrate by both two-step and three-step demineralizing processes. When a potassium bitartrate solution containing 27 meq./l. (milliequivalents per liter) of acidity was passed through the normal two-step demineralizing equipment at 1.5 gallons per minute per square foot of surface area, the bulk of the effluent contained about 10 P. P. M. (parts per million) of electrolyte as calcium carbonate and there were obtained 15 volumes of satisfactorily treated effluent per volume of cation exchanger. Upon doubling the flow rate to 3 gallons per minute per square foot the total volume of low electrolyte effluent delivered was reduced to 12 volumes of satisfactory effluent per volume of cation exchanger while the effluent quality remained the same. However, upon raising the flow rate to the more usual value of 4.2 gallons per minute per square foot, a very short run with poor quality effluent was obtained. In this case even the best effluent sample contained 22 P. P. M. total electrolytes as calcium carbonate and fairly low electrolyte solution was only obtained to the extent of 5 volumes of effluent per volume of cation exchanger.

The apparatus was now rearranged according to the invention so that the anion exchanger was divided into two equal portions and a feed solution of the same composition was then passed through one of these anion exchanger beds, then through the cation exchanger bed and finally through the second anion exchanger bed. When this same 27 meq./l. acidity potassium bitartrate solution was passed through the three-step demineralizing process at 4.5 gallons per minute per square foot, a satisfactory effluent quality of 9-13 P. P. M. total electrolytes as CaCO₃ was obtained and the duration of run corresponded to 13.5 volumes of effluent per volume of cation exchanger.

The graph shown in the accompanying drawing may be referred to for comparison of the three-step process with the two-step process. This shows graphically the results of tests now to be described. Two demineralizing test sets were provided as follows:

Set A was made up of three tubes in series. The first was a 23 mm. I. D. tube and contained 200 ml. of anion exchanger. The second was a 35 mm. I. D. tube and contained 400 ml. of a cation exchanger. The third was a 23 mm. I. D. tube and contained 200 ml. of anion exchanger. This represents a set up according to the invention.

Set B was made up of two tubes in series. The first was a 35 mm. I. D. tube and contained 400 ml. of a cation exchanger. The second was a 35 mm. I. D. tube and contained 400 ml. of anion exchanger. This represents the usual set up for the two-step demineralizing process.

The anion exchanger in each case was an aliphatic amine anion exchange resin known to the trade as "De-Acidite." The cation exchanger in each case was a sulfonated coal known to the trade as "Zeo-Karb." A solution of potassium bitartrate containing about 27 meq. per liter of acidity (H+) was passed through the two sets A and B above described at various rates of flow. The results are as shown and captioned on the graph. Curves 1, 2 and 3 represent the results obtained in set B, the two-step demineralizing process, at a flow rate of 70 ml. per minute, 50 ml. per minute and 27 ml. per minute, respectively. Curve 4 represents the results obtained in set A, the three-step demineralizing process according to the invention, at a flow rate of 75 ml. per minute. The electrolyte content of the effluent is plotted on the Y axis as parts per million calculated as CaCO₃ and effluent volume in liters is plotted on the X axis.

It will be observed that the three-step process (curve 4) gives a good quality of effluent almost immediately while the two-step demineralizing process does this only at extremely low flow rates. In effect, the same amount of anion exchanger and cation exchanger used according to the invention will produce more efficient results than when the same amount is used in the two-step process. In other words the three-step process produces better quality of effluent than the two-step process or greater volume of the same quality than the two-step process, although in each case the amount of both ion exchangers is the same.

In another instance, for example, apple juice containing about 0.42% malic acid was demineralized by the three-step process of this invention and also by the conventional two-step demineralizing process under substantially identical conditions. Use of the three-step process resulted in a 20% increase in cation exchanger capacity.

While I do not wish to be bound to any theory of mechanism of reaction, it is my belief that the observed effect is due to equilibrium displacement. The usual cation exchange reaction when operating with an acid-regenerated cation exchanger may be illustrated by the following equation:

$$H_2Z + Ca^{++} = CaZ + 2H^+$$

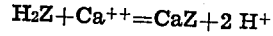

wherein Z is a symbol for exchanger, H is the symbol for hydrogen, and Ca is the symbol for calcium.

When operating with an acid feed, the presence of hydrogen ions in the influent solution will tend to repress the above reaction by virtue of the common ion effect due to the presence of H+ in the feed. By first removing this acid by means of the initial anion exchanger bed, I believe that the three-step demineralizing process permits a more nearly complete reaction to take place in the cation exchanger. Inasmuch as the anion exchanger only removes acids and does not affect anions whose cations have not been converted to hydrogen ion by the cation exchanger, repression of the above reaction will result in a poor effluent quality. By first removing the free acid and thus permitting more complete reaction between the cation exchanger and the salts in the feed solution, the three-step demineralizing process of this invention results in higher capacity, better quality effluent and higher permissible operating flow rates.

A wide choice of materials is available for carrying out the ion exchange steps of this invention. The cation exchange material should be acid-resistant so that it is capable of operations on the "hydrogen cycle," i. e., it must remove metallic ions from solutions replacing them with hydrogen ions and it should be capable of regeneration by strong acids. Cation exchange materials which may be used for the three-step demineralizing process according to this invention, include polyhydric phenol-formaldehyde type resins, resins containing sulfonic acid groups, and sulfonated coal derivatives. The preparation and composition of the cation exchanger is not of particular significance so long as it will perform the above described cation exchange and can be regenerated by strong acids.

Similarly any anion exchange material which will absorb acids and which can be regenerated by alkaline solutions may be used in this process. Among the suitable anion exchange materials are aniline black derivatives, such as emeraldine, metaphenylenediamine-formaldehyde resins, and the various aliphatic amine resins, such as those prepared from the polyalkylene polyamines.

While it is possible to carry out the three-step demineralizing process of this invention by adding the granular ion exchangers individually to the solutions being treated, agitating, and separating the granular material, in the preferred procedure the ion exchange materials are used in the form of fixed beds through which the solutions are caused to flow. Suitable equipment containing proper bed supports, liquid distributors, and satisfactory valve arrangements are well known and further description of them is deemed unnecessary.

The terms and expressions which have been employed herein are used as terms of description and not of limitation and there is no intention in the use of such terms and expressions of excluding any equivalent of the features shown and described or portions thereof, but it is recognized that various modifications are possible within the scope of invention claimed.

What is claimed is:

1. The process of removing electrolytes from an acidic solution containing salts which comprises bringing the solution first in contact with an anion exchanger to remove acids from the solution; thereafter bringing the solution in contact with a cation exchanger to remove metallic cations present and to replace them with hydrogen ions forming acids; and then bringing the solution in contact with an anion exchanger to remove acids formed in the solution during the cation exchange reaction.

2. A three-step process for demineralizing a solution of a metallic acid salt which comprises passing the solution through a bed of anion exchanger to remove that portion of the salt present as acid as a first step, thereafter as a second step passing the solution through a bed of cation exchanger to convert that portion of the salt present as a metallic salt to acid by replacing the metallic ions with hydrogen ions and thereafter as a third step passing the solution through a bed of anion exchanger to remove the acid formed in said second step.

3. A process for removing tartrate values from a solution containing both free tartaric acid and its metallic salts which comprises passing said solution as a first step in contact with a bed of anion exchanger to remove that part which is present as tartaric acid, thereafter as a second step passing said solution in contact with a bed of cation exchanger to remove the metallic ions present in the salt and replace them with hydrogen to convert said salt to tartaric acid, and as a third step passing said solution in contact with a bed of anion exchanger to remove tartaric acid then present in the solution.

4. A three-step demineralizing process for demineralizing a feed solution containing an acid and a metallic salt in a known ratio which comprises passing said solution successively through a bed of anion exchanger, a bed of cation exchanger and a second bed of anion exchanger in which the total anion exchanger capacity is divided so that the ratio of the capacity of the first anion exchanger bed to the capacity of the second anion exchanger bed is substantially the same as the ratio of the concentration of free acid in the feed to the concentration of salt in the feed.

FRANKLIN I. LATIMER LAWRENCE.

REFERENCES CITED

The following references are of record in the file of this patent:

Apple Sirup by Ion Exchange Process, by Buck et al. (Indust. and Eng. Chem., 37 #7, pages 635 to 638).